US007504153B2

(12) United States Patent
Kurose et al.

(10) Patent No.: US 7,504,153 B2
(45) Date of Patent: Mar. 17, 2009

(54) POROUS BODY, PRODUCTION METHOD THEREOF AND COMPOSITE MATERIAL USING THE POROUS BODY

(75) Inventors: Takashi Kurose, Yamagata (JP); Tatsuhiro Takahashi, Yamagata (JP); Chiaki Sotowa, Kanagawa (JP); Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 454 days.

(21) Appl. No.: 10/556,431

(22) PCT Filed: May 12, 2004

(86) PCT No.: PCT/JP2004/006697

§ 371 (c)(1),
(2), (4) Date: Nov. 9, 2005

(87) PCT Pub. No.: WO2004/101664

PCT Pub. Date: Nov. 25, 2004

(65) Prior Publication Data

US 2007/0042901 A1 Feb. 22, 2007

(30) Foreign Application Priority Data

May 13, 2003 (JP) ............................. 2003-134964

(51) Int. Cl.
*B32B 9/00* (2006.01)
(52) U.S. Cl. .................. 428/408; 428/293.1; 428/297.4; 423/447.3; 977/842; 264/29.2
(58) Field of Classification Search .................. 428/408, 428/367, 293.1, 297.4; 501/180; 423/447.1, 423/447, 2, 447.3; 361/303; 264/29.2; 977/842
See application file for complete search history.

(56) References Cited

U.S. PATENT DOCUMENTS 4,663,230 A * 5/1987 Tennent ...................... 428/367

(Continued)

FOREIGN PATENT DOCUMENTS

| JP | 3-237010 A | 10/1991 |
|----|------------|---------|
| JP | 2002-180356 A | 6/2002 |
| JP | 2002-327113 A | 11/2002 |
| JP | 2002-348741 A | 12/2002 |

(Continued)

OTHER PUBLICATIONS

Patent Abstracts of Japan, vol. 016, No. 020 (C-0902), Jan 20, 1992 & JP 03 237010 A (Mitsui Eng & Shipbuild Co Ltd), Oct. 22, 1991.

*Primary Examiner*—N. Edwards
(74) *Attorney, Agent, or Firm*—Sughrue Mion, PLLC

(57) ABSTRACT

A porous material comprising vapor grown carbon fiber in an amount of 10 to 90 mass %, fiber filaments of the carbon fiber forming a three-dimensional network and having a diameter of 1 to 1,000 nm, an aspect ratio of 5 to 15,000, a specific surface area (by BET method) of 2 to 2,000 m²/g, and the ratio of the intensity of the peak at 1,360 cm$^{-1}$ in a Raman scattering spectrum of the carbon fiber to that of the peak at 1,580 cm$^{-1}$ in the spectrum($I_{1360}/I_{1580}$) is 0.1 to 2.0, wherein the porosity of the porous material ($V/V_0$) is 0.50 to 0.99 and a specific surface area is 5 to 1,000 m²/g; and a production method and use thereof. The vapor grow carbon fiber impregnated in the porous material of the present invention does not contain aggregates and a three-dimensional network is formed between the fiber filaments, wherein length of each of the fiber filaments is maintained. Therefore, the vapor grown carbon fiber enables to readily produce a composite material (porous material), in which even a small amount of addition of vapor grown carbon fiber can exhibit sufficient effect.

29 Claims, 4 Drawing Sheets

U.S. PATENT DOCUMENTS

| | | | |
|---|---|---|---|
| 4,772,508 A | | 9/1988 | Brassel |
| 5,691,054 A | * | 11/1997 | Tennent et al. ............... 428/359 |
| 5,968,650 A | * | 10/1999 | Tennent et al. ............... 428/367 |
| 6,031,711 A | * | 2/2000 | Tennent et al. ............... 361/303 |
| 6,099,965 A | * | 8/2000 | Tennent et al. ............... 428/408 |
| 6,221,489 B1 | * | 4/2001 | Morita et al. ............... 428/367 |
| 6,235,674 B1 | * | 5/2001 | Tennent et al. ............... 502/174 |
| 6,432,866 B1 | * | 8/2002 | Tennent et al. ............... 502/180 |
| 6,489,025 B2 | | 12/2002 | Morita et al. |
| 6,492,014 B1 | * | 12/2002 | Rolison et al. ........... 428/317.9 |
| 6,946,110 B2 | | 9/2005 | Nishimura et al. |
| 6,960,389 B2 | * | 11/2005 | Tennent et al. ............... 428/408 |
| 7,150,840 B2 | | 12/2006 | Yamamoto et al. |
| 7,150,911 B2 | * | 12/2006 | Morita et al. ............... 428/368 |
| 7,160,615 B2 | * | 1/2007 | Iwaida et al. ............... 428/403 |
| 2001/0024716 A1 | | 9/2001 | Chen et al. |
| 2007/0042901 A1 | * | 2/2007 | Kurose et al. ............... 502/180 |
| 2007/0059233 A1 | * | 3/2007 | Sheem et al. ........... 423/445 R |

FOREIGN PATENT DOCUMENTS

| | | |
|---|---|---|
| WO | WO 94/25268 A1 | 11/1994 |
| WO | WO 95/09822 A1 | 4/1995 |
| WO | WO 97/43116 A1 | 11/1997 |
| WO | WO 99/23287 A1 | 5/1999 |
| WO | WO 02/49412 A1 | 6/2002 |

* cited by examiner

POROUS BODY, PRODUCTION METHOD THEREOF AND COMPOSITE MATERIAL USING THE POROUS BODY

CROSS REFERENCE TO THE RELATED APPLICATIONS

This is an application filed pursuant to 35 U.S.C. Section 111(a) with claiming the benefit of U.S. Provisional application Ser. No. 60/472,129 filed May 21, 2003 under the provision of 35 U.S.C. Section 111(b), pursuant to 35 U.S.C. Section 119(e)(1).

TECHNICAL FIELD

The present invention relates to a porous material containing vapor grown carbon fiber. More particularly, the present invention relates to a porous composite material containing vapor grown carbon fiber and a gelable substance, which material is obtained by dispersing vapor grown carbon fiber in a solution of an organic or inorganic gelable substance (i.e., a raw material capable of being gelled), and gelling the gelable substance, followed by removing the solvent and drying; to a method for producing the composite material; and to use of the same.

BACKGROUND ART

Carbon fiber produced through melt-spinning of petroleum pitch or polyacrylonitrile, or vapor grown carbon fiber produced through thermal decomposition of a hydrocarbon compound in an inert atmosphere in the presence of a metal serving as a catalyst is excellent in terms of thermal conductivity, electrical conductivity, mechanical strength, etc. Therefore, a variety of composite materials have been developed, which employs vapor grown carbon fiber in order to, for example, impart electrical conductivity or thermal conductivity to a resin and the like.

Conventionally, a composite material containing carbon fiber with a resin and the like has been prepared by means of a method in which a prepreg is formed from carbon fiber using a binder, or a carbon fiber fabric or the like is formed, and the prepreg or the fabric is impregnated with a resin and the like.

Japanese Patent Laid-Open Publication (kokai) No. 2002-327113 discloses a resin composition serving as a binder for preparing a prepreg of carbon fiber; and Japanese Patent Laid-Open Publication (kokai) No. 2002-180356 discloses a three-dimensional fiber structure formed of carbon fiber, which is to be impregnated with a metallic material.

Meanwhile, preparation of a prepreg of vapor grown carbon fiber is very difficult as compared with the case of a prepreg of the carbon fiber described in the aforementioned patent documents, since, for example, vapor grown carbon fiber has a diameter smaller than that of the aforementioned carbon fiber. Even when a prepreg can be formed from vapor grown carbon fiber, the prepreg contains only small amounts of pores, and therefore, the prepreg fails to be sufficiently impregnated with a material for preparing a composite material.

Therefore, a resin composite material containing vapor grown carbon fiber has generally been prepared by means of, for example, a method in which vapor grown carbon fiber is kneaded with a resin by use of a kneading machine. However, in the method, during the course of kneading, fiber filaments of the carbon fiber are cut into short fiber fragments, and thus the degree of three-dimensional network formation between the fiber filaments becomes insufficient. Therefore, in order to compensate for the thus-cut fiber filaments, a large amount of vapor grown carbon fiber must be added to the resin. However, addition of a large amount of vapor grown carbon fiber causes problems, including deterioration of flow characteristics of the resin during the course of molding, and an increase in production cost.

In an effort to solve such problems, many studies have been made.

Japanese Patent Laid-Open Publication (kokai) No. 2002-348741 discloses vapor grown carbon fiber having a herringbone crystal structure in which end portions of active crystals are exposed to the outside of the carbon fiber. According to this publication, the vapor grown carbon fiber having a herringbone crystal structure exhibits high affinity to a resin and the like; readily assumes an S-like shape, a Z-like shape or a spiral shape when kneaded with a resin; and exhibits good fitting to a resin. Therefore, even when a small amount of the vapor grown carbon fiber is added to a resin, sufficient effects are obtained.

Japanese Kohyo Patent Publication No. 2001-521984 (WO99/23287) discloses a composite material which is obtained through the following procedure: there is prepared a porous material containing vapor grown carbon fiber, each fiber filament of the carbon fiber having a substantially uniform diameter of 3.5 to 70 nm and a substantially cylindrical shape, the porous material corresponding to the aforementioned prepreg of carbon fiber; and the porous material is impregnated with a resin, or polymerization of an organic monomer is performed in the porous material.

Japanese Kohyo Patent Publication No. 8-509788 (WO94/25268) discloses a method for producing a porous material employed in such a composite material, in which vapor grown carbon fiber is dispersed in water or an organic solvent, and then the solvent is removed. Meanwhile, Japanese Kohyo Patent Publication No. 2000-511864 (WO97/43116) discloses that when fiber filaments of vapor grown carbon fiber are melt-bonded or joined together at their contact points by use of an adhesive and/or by means of thermal decomposition, a hard porous material is produced. This patent document also discloses that the hard porous material is produced by means of a method that vapor grown carbon fiber is dispersed in a solution in which an adhesive is dissolved or in a gel fluid, and subsequently the solvent is removed, or the resultant dispersion is subjected to supercritical extraction.

However, the production methods disclosed in the aforementioned publications involve problems attributed to the following: vapor grown carbon fiber is contained in the form of aggregates in the porous material, an operation for applying high shear force is performed in order to separate the aggregates into individual fiber filaments, and excessive kneading is performed by use of a kneading machine during the production of the porous material. When the carbon fiber is contained in the form of aggregates in the porous material or in the resultant composite material, the degree of network formation between fiber filaments of the carbon fiber is lowered as compared with the case where individual fiber filaments of the carbon fiber are present as separated from one -another in the porous material, and thus electrical conductivity or the like of the porous material is lowered, since the electrical conductivity or the like is basically affected by the degree of network formation between the aggregates of the carbon fiber. Therefore, the amount of the vapor grown carbon fiber to be added must be increased, which may lead to lowering of moldability and the like. Meanwhile, when kneading is performed by use of a kneading machine, or fiber filaments of the carbon fiber are dispersed through application of high shear force, the fiber filaments are cut into fiber fragments. Thus the degree of three-dimensional network formation between the fiber filaments becomes insufficient, which causes the problems similar to those aforementioned when the amount of the vapor grown carbon fiber to be added must be increased.

Meanwhile, there have been disclosed a porous molded member formed by mixing and dispersing, in water, a metal or a non-metallic solid, an organic gelable binder such as agar and an inorganic binder, and gelling the resultant dispersion by means of gelation of the organic binder, followed by freeze-drying; and a method for forming a porous molded member characterized by thermally treating the above molded member, thereby curing the inorganic binder (Japanese Kohyo Patent Publication No. 9-505266 (WO95/09822)). However, this method involves a problem that the molded member considerably shrinks in volume during the course of thermal treatment.

DISCLOSURE OF THE INVENTION

An object of the present invention is to provide a porous material containing substantially no aggregates of fiber filaments of vapor grown carbon fiber, wherein the length of each of the fiber filaments is maintained, and a three-dimensional network is formed between the fiber filaments.

Another object of the present invention is to provide a method for readily producing a composite material (porous material) containing vapor grown carbon fiber and a resin and the like, wherein the vapor grown carbon fiber exhibits its effects even when added in a small amount.

Yet another object of the present invention is to provide a method for producing a porous material which exhibits low volumetric shrinkage when thermally treated.

In order to solve the aforementioned problems, it is important to produce a porous material containing vapor grown carbon fiber, in which the length of each of fiber filaments of the carbon fiber is maintained, and a three-dimensional network is formed between the fiber filaments.

The present inventors have performed extensive studies on use of vapor grown carbon fiber exhibiting excellent dispersibility in combination with a substance capable of readily forming a porous material or a method for producing a porous material. As a result, the present inventors have found that vapor grown carbon fiber containing a small amount of curved fiber filaments and exhibiting high linearity can be readily dispersed in a solution by means of, for example, ultrasonic irradiation; a porous material can be readily produced from an organic material such as agar, serving as a material capable of forming a porous material; and such a porous material can be produced relatively readily by means of the generally well-known sol-gel method. The present invention has been accomplished on the basis of these findings.

Accordingly, the present invention provides a porous material, a method for producing the same, and a composite material comprising the porous material, as described below.

1. A porous material characterized by comprising vapor grown carbon fiber, fiber filaments of the carbon fiber forming a three-dimensional network.
2. The porous material according to 1 above, wherein the amount of the vapor grown carbon fiber is 10 to 95 mass %.
3. The porous material according to 1 or 2 above, wherein each fiber filament of the vapor grown carbon fiber has a diameter of 1 to 1,000 nm, an aspect ratio of 5 to 15,000, and a specific surface area of 2 to 2,000 $m^2/g$, and the ratio of the intensity of the peak at 1,360 $cm^{-1}$ in a Raman scattering spectrum to that of the peak at 1,580 $cm^{-1}$ in the spectrum; i.e., $I_{1360}/I_{1580}$, is 0.1 to 2.0.
4. The porous material according to any one of 1 through 3 above, wherein boron is contained, in an amount of 0.001 to 5 mass %, in the interior of or on the surface of crystals constituting the vapor grown carbon fiber.
5. The porous material according to any one of 1 through 4 above, wherein the porosity of the porous material, which is represented by the ratio of the total volume of pores (V) to the entire volume ($V_0$) of the porous material; i.e., $V/V_0$, is 0.50 to 0.99.
6. The porous material according to any one of 1 through 5 above, which has a specific surface area of 5 to 1,000 $m^2/g$.
7. The porous material according to any one of 1 through 6 above, wherein cell walls of the porous material have a further porous structure.
8. The porous material according to any one of 1 through 7 above, which has an electrical resistivity of less than $10^3$ Ω·cm.
9. A method for producing the porous material comprising vapor grown carbon fiber as recited in 1 above, which is characterized by comprising dispersing vapor grown carbon fiber in a solution of a gelable substance, and subsequently gelling the gelable substance, followed by removal of solvent.
10. The method for producing a porous material according to 9 above, wherein the solution of a gelable substance is a solution containing a water-soluble polymer and/or an alkali silicate dissolved therein, and/or solid fine particles dispersed therein.
11. The method for producing a porous material according to 9 or 10 above, wherein, after the solvent is removed, thermal treatment is carried out in an inert atmosphere at a temperature of 100 to 1,000° C.
12. The method for producing a porous material according to 9 or 10 above, wherein removal of the solvent is carried out by means of vacuum-drying or freeze-drying.
13. The method for producing a porous material according to 9 or 10 above, wherein removal of the solvent is carried out by increasing temperature and pressure above the critical temperature and critical pressure of the solvent, respectively, and by subsequently reducing pressure to the critical pressure of the solvent or lower.
14. The method for producing a porous material according to 9 or 10 above, wherein the gelable substance is an organic compound.
15. The method for producing a porous material according to 14 above, wherein the organic compound is at least one species selected from agar, agarose, gelatin and an alginic acid salt, and the solvent is water.
16. The method for producing a porous material according to 15 above, wherein the solvent is an aqueous solution containing a surfactant.
17. The method for producing a porous material according to 10 above, wherein the water-soluble polymer is at least one species selected from phenolic resin, polyvinyl alcohol, polyethylene oxide, polyacrylic acid and a polyacrylic acid salt.
18. The method for producing a porous material according to 9 or 10 above, wherein the gelable substance is a sol produced through hydrolysis, condensation, or polymerization of a metallic compound dissolved in a polar solvent by use of an acid or an alkali.
19. The method for producing a porous material according to 18 above, wherein the metallic compound is at least one species selected from metal alkoxide, metal acetylacetonate, acetic acid metallic salt, carboxylic acid metallic salt, nitric acid metallic salt, metallic chloride and metallic oxy compound, and the solvent is water or a mixture of water and a polar organic solvent.
20. A method for producing the porous material as recited in 1 above, characterized by comprising dispersing vapor grown carbon fiber in a liquid polymer, and subsequently foaming the liquid polymer.
21. The method for producing a porous material according to 20 above, the liquid polymer contains a polyisocyanate and a polyol.
22. A porous material produced through the production method as recited in any one of 9 through 21 above.
23. A resin composite material characterized by being formed by impregnating with a polymer the porous material as recited in any one of 1 through 8 and 22 above.
24. The resin composite material according to 23 above, wherein the polymer is at least one polymer selected from phenolic resin, epoxy resin, polyimide and polycarbonate.
25. A method for producing a resin composite material, characterized by comprising impregnating with a polymer the porous material as recited in any one of 1 through 8 and 22 above.
26. A metal composite material characterized by being formed by incorporating a metal into the porous material as recited in any one of 1 through 8 and 22 above.
27. The metal composite material according to 26 above, wherein the metal is at least one metal selected from aluminum, magnesium, copper and silver or a molten alloy thereof.
28. A method for producing a metal composite material, characterized by incorporating a metal into the porous material as recited in any one of 1 through 8 and 22 above.
29. A filter for absorption of gas comprising the porous material as recited in any one of 1 through 8 and 22 above.
30. A filter for filtration of water comprising the porous material as recited in any one of 1 through 8 and 22 above.
31. A catalyst carrier comprising the porous material as recited in any one of 1 through 8 and 22 above.

Vapor Grown Carbon Fiber

The vapor grown carbon fiber employed in the present invention can be produced by feeding a gasified organic compound into a high-temperature inert gas atmosphere together with iron serving as a catalyst (e.g., Japanese Patent Laid-Open Publication (kokai) No. 7-150419).

The vapor grown carbon fiber to be employed may be "as-produced" carbon fiber; carbon fiber obtained through, for example, thermal treatment of "as-produced" carbon fiber at 800 to 1,500° C.; or carbon fiber obtained through, for example, graphitization of "as-produced" carbon fiber at 2,000 to 3,000° C.

Each fiber filament of the vapor grown carbon fiber employed in the present invention preferably has a hollow structure along its axis. In this case, cylinder-forming carbon layers of the filament assume uninterrupted layers. As used herein, the term "hollow structure" refers to a structure in which a plurality of carbon layers form a cylinder, and the diameter of the fiber is substantially not uniform. The hollow structure encompasses a structure in which cylinder-forming carbon layers form an incomplete cylinder; a structure in which the carbon layers are partially broken; and a structure in which the laminated two carbon layers are bonded into a single carbon layer.

The cross section of each fiber filament of the vapor grown carbon fiber does not necessarily assume a round shape, and may assume an elliptical or polygonal shape. The surface of the fiber filament contains a carbonaceous substance formed through deposition of thermally decomposed carbon. When the vapor grown carbon fiber is subjected to thermal treatment at 2,000° C. or higher after the carbon fiber has been produced, crystallinity of the carbon fiber is further enhanced, thereby increasing electrical conductivity.

The vapor grown carbon fiber employed in the present invention may contain boron, in an amount of 0.001 to 5 mass %, in the interior of or on the surface of crystals constituting the carbon fiber. Boron promotes graphitization of the carbon fiber. A boron compound is added to the vapor grown carbon fiber before the carbon fiber is subjected to thermal treatment. Examples of the boron compound include boron carbide ($B_4C$), boron oxide ($B_2O_3$), elemental boron, boric acid ($H_3BO_3$) and a borate.

No particular limitations are imposed on the amount of a boron compound added to the vapor grown carbon fiber, since the amount varies in accordance with chemical properties and physical properties of the boron compound. For example, when boron carbide ($B_4C$) is employed, the amount of boron carbide is 0.01 to 10 mass %, preferably 0.1 to 5 mass %, on the basis of the entirety of the vapor grown carbon fiber. When the vapor grown carbon fiber is thermally treated in the presence of a boron compound, crystallinity of carbon constituting the thus-graphitized vapor grown carbon fiber is enhanced, and the carbon fiber exhibits enhanced electrical conductivity.

Even when a compound such as silicon, aluminum and beryllium is employed in place of a boron compound, graphitization of the carbon fiber can be promoted.

The filament of vapor grown carbon fiber employed in the present invention preferably has the following physical property values:

Diameter: 1 to 1,000 nm, preferably 1 to 200 nm;
Aspect ratio: 5 to 15,000, preferably 5 to 5,000;
Specific surface area: 2 to 2,000 m²/g, preferably 10 to 1,000 m²/g; and
Ratio of the intensity of the peak at 1,360 $cm^{-1}$ in a Raman scattering spectrum of the carbon fiber to that of the peak at 1,580 $cm^{-1}$ in the spectrum ($I_{1360}/I_{1580}$): 0.1 to 2.0, preferably 0.1 to 1.5.

The vapor grown carbon fiber preferably contains a small amount of curved fiber filaments and exhibits high linearity. Such carbon fiber is readily dispersed in a solvent or a solution, since entanglement of fiber filaments of the carbon fiber can be suppressed.

Porous Material

The porous material of the present invention can be produced through the following procedure: the vapor grown carbon fiber is dispersed in a solution of a raw material to be gelled (i.e., a gelable substance), and subsequently the gelable substance is gelled, thereby yielding a gel-like product containing the dispersed vapor grown carbon fiber (i.e., a product obtained through gelation of the gelable substance solution), followed by removal of solvent through drying.

The gelable substance may be an organic compound, or a sol produced through hydrolysis, condensation, or polymerization of a metallic compound dissolved in a polar solvent by use of an acid or an alkali. Examples of the organic compound include agar, agarose, gelatin and an alginic acid salt. Examples of the metallic compound include metal alkoxide, metal acetylacetonate, acetic acid metallic salt, carboxylic acid metallic salt, nitric acid metallic salt, metallic chloride and metallic oxy compound. These compounds may be employed singly or in combination of two or more species.

No particular limitations are imposed on the solvent to be employed, and water, various organic solvents, and a mixture solvent thereof can be employed. When the gelable substance is an organic compound such as agar, agarose, gelatin and an alginic acid salt, the solvent is preferably water, whereas when the gelable substance is the aforementioned sol, the solvent is preferably water or a solvent mixture of water and a polar organic solvent. In the case where a highly polar solvent such as water is employed, preferably, a surfactant is employed in combination with the solvent. No particular limitations are imposed on the surfactant to be employed, and a dodecylbenzenesulfonic acid salt may be employed, for example.

The vapor grown carbon fiber may be dispersed in the gelable substance solution by use of a stirring apparatus which does not apply shear force, such as a magnetic stirrer; or by means of stirring under ultrasonic irradiation. Preferably, stirring under ultrasonic irradiation is performed.

Alternatively, a gel fluid may be employed in place of the gelable substance solution, and the vapor grown carbon fiber may be directly dispersed in the gel fluid.

Removal of the solvent is preferably carried out by means of vacuum-drying, freeze-drying or supercritical extraction.

In the case where the solvent is removed by means of supercritical extraction, the temperature and pressure surrounding the solvent are increased to become higher than the critical temperature and critical pressure of the solvent, respectively, and subsequently the pressure of the atmosphere is reduced to become equal to or lower than the critical pressure of the solvent, thereby yielding two phases; i.e., a vapor phase and a liquid phase, followed by separation of the solvent and the porous material. When this process is repeated several times, the solvent can be completely removed.

The strength, chemical properties, and physical properties of the porous material can be regulated by dissolving a water-soluble substance, serving as a third component, in the gelable substance solution. No particular limitations are imposed on the water-soluble substance, so long as it can be dissolved in water. Examples of the water-soluble substance include water-soluble polymers (organic compounds) such as phenolic resin, polyvinyl alcohol, polyethylene oxide, polyacrylic acid and polyacrylic acid salts (e.g., sodium polyacrylate and calcium polyacrylate); and inorganic compounds such as alkali silicates. When the third component is an organic compound, the third component exhibits effects such as enhancing bonding between fiber filaments of the carbon fiber, regulating the size of pores of the porous material, or introducing a new functional group into the porous material, thereby changing its surface conditions. When the third component is an inorganic compound, the third component exhibits the effect of introducing a metallic element into the porous material, thereby changing its surface conditions.

The strength, chemical properties and physical properties of the porous material can also be regulated by dispersing a binder (e.g., a dispersion containing fine particles), serving as a third component, in the gelable substance solution. No particular limitations are imposed on the type of such a dispersion, so long as the dispersion does not break a specific porous structure formed through drying of a gelable substance such as agar. Examples of such a dispersion include a dispersion containing dispersed fine particles of a fluorine-containing resin (e.g., polytetrafluoroethylene).

The porous material of the present invention can be produced by means of a method other than the aforementioned method. For example, the porous material can be produced by dispersing the vapor grown carbon fiber in a liquid polymer, and subsequently foaming the liquid polymer. Examples of the liquid polymer include a polymer formed of a polyisocyanate and a polyol.

The porous material may be employed in a composite material in combination with a polymer or a metal, various filters or a catalyst carrier.

In order to prepare a denser composite material exhibiting excellent properties such as high mechanical strength, the porous material must contain maximum possible pores. Therefore, the porosity of the porous material preferably falls within a range of 0.50 to 0.99. More preferably, the porosity is 0.70 to 0.99. When the porosity is less than 0.50; i.e., the amount of pores is small, the porous material fails to be sufficiently impregnated with a matrix material.

When the porous material is employed in various filters or a catalyst carrier, efficiency of contact between the porous material and a gas or a liquid per unit volume of the material must be enhanced. From such a viewpoint, preferably, the porosity of the porous material falls within the above range.

As used herein, the term "porosity" is represented by the ratio of the total volume of pores (V) to the entire volume (apparent volume: $V_0$) of the porous material; i.e., $V/V_0$.

In the present invention, cell walls forming pores of the porous material may have a porous structure (see FIG. 3). When the cell walls have a porous structure, the porous material is envisaged to exhibit specific physical effects. For example, when the porous material is employed in a catalyst carrier, the carrier is envisaged to support a drastically increased amount of a catalyst.

The cell walls having a porous structure can be formed by adding a dispersion of fluorine-containing resin fine particles to a liquid in which the vapor grown carbon fiber has been dispersed, and adding thereto an aqueous agar solution of 60° C., followed by stirring and drying.

The specific surface area of the porous material is preferably regulated to 5 to 1,000 $m^2/g$, more preferably 10 to 1,000 $m^2/g$. When the specific surface area exceeds the above range, the mechanical strength of the porous material is lowered, and the surface of the porous material fails to exhibit sufficient affinity to a matrix material, resulting in failure of preparing a sufficiently dense composite material.

When thermally treated at high temperature or used at high temperature, the porous material of the present invention exhibits low volumetric shrinkage. When the volumetric shrinkage is high, dimensions of the porous material are very difficult to design, and product cost increases in accordance with reduction of the volume, leading to economical disadvantages. When the porous material of the present invention is heated in an inert atmosphere at a temperature of 100 to 1,000° C., the volumetric shrinkage percent of the porous material is less than 20%, which enables a practical use of the porous material.

When the porous material is thermally treated at high temperature, carbonization of agar and other additives can be promoted, and accordingly, the surface properties of the porous material can be changed (e.g., from hydrophilicity to hydrophobicity). When a composite material is prepared from the porous material thermally treated at high temperature, impairment of the composite material, due to the evaporation of moisture, can be suppressed.

The electrical resistivity (volume resistivity) of the porous material of the present invention is preferably regulated to less than $10^3$ $\Omega \cdot cm$ in accordance with use of the porous material. More preferably, the electrical resistivity is less than $10^2$ $\Omega \cdot cm$.

Reduction of the electrical resistivity (i.e., enhancement of the electrical conductivity) of the porous material can be attained by, for example, increasing the amount of the vapor grown carbon fiber incorporated into the porous material, thermally treating the porous material after removal of the solvent, or enhancing the electrical conductivity of the vapor grown carbon fiber. In the porous material of the present invention, fiber filaments of the carbon fiber are highly connected to one another, forming a high-level three-dimensional network. Therefore, even when the amount of the vapor grown carbon fiber is not increased to the level in the case of the conventional porous material, the electrical resistivity can be reduced to a target level.

Composite Material

The composite material of the present invention can be produced by impregnating the above-prepared porous material with a generally employed matrix material. Specifically, the composite material can be produced by impregnating the porous material with a molten resin or molten metal serving as a matrix material, or by incorporating such a matrix material into the porous material.

Examples of the resin serving as a matrix include phenolic resin, epoxy resin, polyimide and polycarbonate. Examples of the metal serving as a matrix include aluminum, magnesium, copper, silver and a molten alloy thereof.

Other Uses

The porous material of the present invention is useful for producing a composite material containing the vapor grown carbon fiber forming a three-dimensional network. In addition, the porous material can be employed as a material for producing a filter such as a filter for absorption of gas, a filter for filtration of water and a filter for removal of a chlorine compound. Furthermore, the porous material can be employed as a gas-permeable porous material for producing a catalyst, a catalyst carrier or a fuel cell.

BEST MODE FOR CARRYING OUT THE INVENTION

Figure 1:
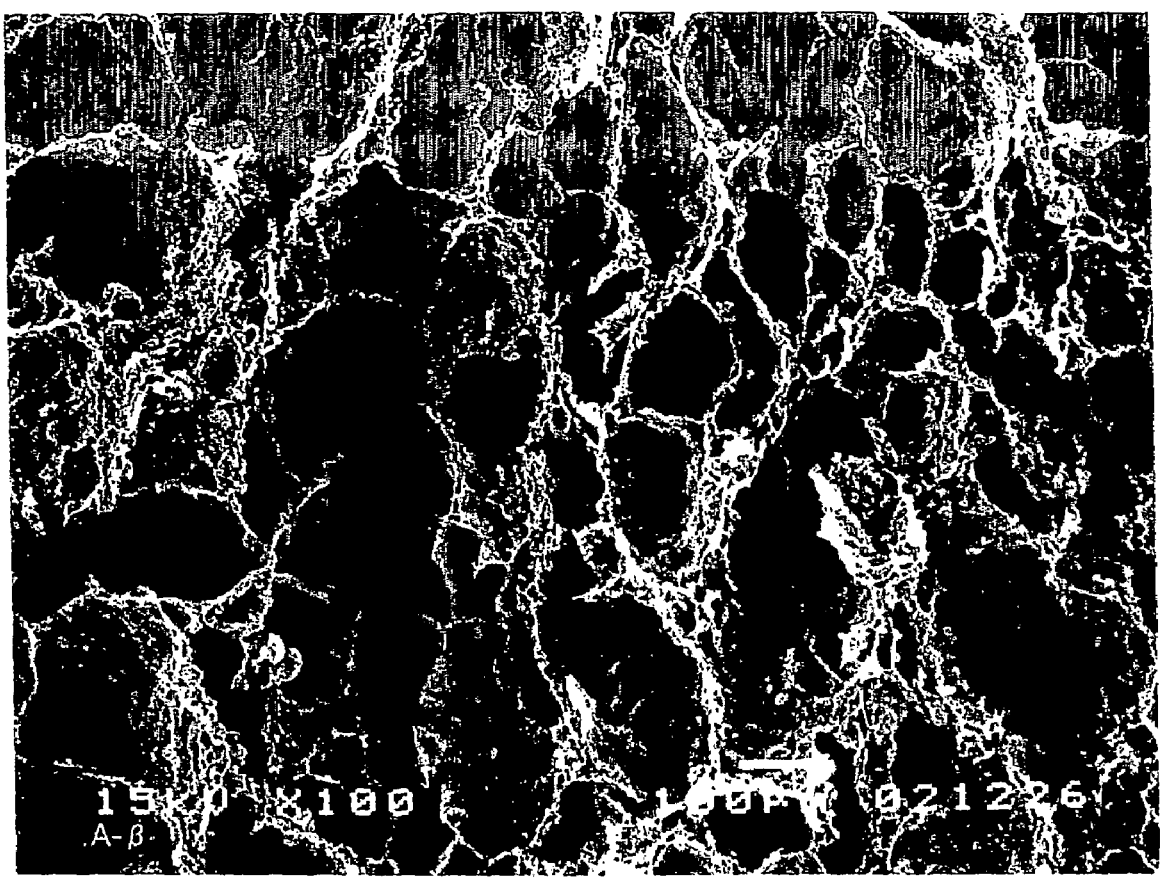
FIG. 1 shows a scanning electron micrograph of the porous material produced in Example 1.

The present invention will next be described in more detail with reference to representative examples, which should not be construed as limiting the invention thereto.

The porosity, the vapor grown carbon fiber content, the specific surface area and the resistivity of the porous material of the present invention were measured by means of the below-described methods.

Porosity:

The porosity of the porous material was obtained through the following procedure: the length of each side of the porous material assuming a cubic or rectangular parallelepiped shape was measured and the entire volume ($V_0$) of the porous material was calculated; the true density of the porous material was measured by use of a true density measuring apparatus (Ultra Pycnometer 1000, product of Yuasa Ionics Inc.); the reciprocal of the thus-measured true density was multiplied by the mass of the porous material, and the resultant value was subtracted from the entire volume ($V_0$), thereby yielding the total volume (V) of pores; and the ratio of the total pore volume (V) to the entire volume ($V_0$) of the porous material; i.e., $V/V_0$ (porosity), was calculated.

Vapor Grown Carbon Fiber Content:

The ratio of the mass of vapor grown carbon fiber employed in the porous material to that of the porous material was taken as the vapor grown carbon fiber content (%) of the porous material.

Specific Surface Area:

The porous material sample was crushed into pieces having a size of about 1 to about 2 mm, and the pieces were charged into an exclusive glass cell. The specific surface area of the pieces was measured by use of a specific surface area measuring apparatus (NOVA-1200, product of Yuasa Ionics Inc.) by means of the BET method, which is generally employed for specific surface area measurement.

Volume Resistivity:

A sample (size: 5 cm×5 cm) was precisely cut out of the porous material, and the thickness of the sample was precisely measured by use of a micrometer (product of Nihon Sokutei Kogu). Subsequently, the volume resistivity of the sample was measured by use of a resistivity meter (Loresta HP, model: MCP-T410, product of Dia Instruments Co., Ltd.) by means of the four-probe method.

EXAMPLE 1

Agar (1.5 g) was dissolved in purified water (50 g) under heating at 95° C., to thereby prepare a solution (the solution will be called "liquid A"). Separately, sodium dodecylbenzenesulfonate (concentration: 40 mass %, product of Aldrich) (0.45 g) was added to purified water (75 g). To the resultant mixture was added vapor grown carbon fiber (VGCF (registered trademark), product of Showa Denko K. K.; fiber diameter: 150 nm, aspect ratio: 60, specific surface area: 13 $m^2/g$, Raman spectrum intensity ratio: 0.15) (4.2 g). The resultant mixture was subjected to ultrasonic irradiation for 30 minutes, and then to stirring for one hour by use of a magnetic stirrer, to thereby prepare a dispersion (the dispersion will be called "liquid B").

After being cooled to 60° C., the liquid A was mixed with the liquid B. Thereafter, the resultant mixture was frozen in a freezer at −15° C. to −20° C. Subsequently, the thus-frozen product was removed from the freezer, and placed in a freeze-drying apparatus (FD-15LI, product of Sanpec) for removal of water, to thereby produce a porous material. Freeze-drying was performed through the following procedure: firstly the pressure in the apparatus was reduced and maintained at 450 Pa or less, and subsequently the apparatus was heated at 0 to 60° C. for 24 hours for sublimation of ice.

The thus-produced porous material was found to have a porosity of 0.95, a vapor grown carbon fiber content of 74 mass %, a specific surface area of 12 $m^2/g$, and a volume resistivity of 130 Ω·cm. Observation of the porous material under a scanning electron microscope revealed that the material contains numerous pores (FIG. 1).

EXAMPLE 2

The porous material produced in Example 1 was thermally treated in a tubular heating furnace under a stream of argon gas (10 L/min) at 800° C. for one hour. The thus-treated porous material was found to have a porosity of 0.98, a vapor grown carbon fiber content of 93 mass %, a specific surface area of 520 $m^2/g$, and a volume resistivity of 40 Ω·cm. The percent volumetric shrinkage of the porous material during thermal treatment was found to be 13 vol. %.

EXAMPLE 3

Agar (1.5 g) was dissolved in purified water (50 g) under heating at 95° C., to thereby prepare a solution (the solution will be called "liquid A"). Separately, sodium dodecylbenzenesulfonate (concentration: 40 mass %, product of Aldrich) (0.45 g) was added to purified water (75 g). To the resultant mixture was added vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (8.5 g). The resultant mixture was subjected to ultrasonic irradiation for 30 minutes, and then to stirring for one hour by use of a magnetic stirrer, to thereby prepare a dispersion (the dispersion will be called "liquid B").

After being cooled to 60° C., the liquid A was mixed with the liquid B. Thereafter, the resultant mixture was frozen in a freezer at −15° C. to −20° C. Subsequently, the thus-frozen product was removed from the freezer, and subjected to freeze-drying in a manner similar to that of Example 1, to thereby produce a porous material. The thus-produced porous material was found to have a porosity of 0.98, a vapor grown carbon fiber content of 85 mass %, a specific surface area of 13 m²/g, and a volume resistivity of 10 Ω·cm.

EXAMPLE 4

Agar (1.5 g) was dissolved in purified water (50 g) under heating at 95° C., to thereby prepare a solution (the solution will be called "liquid A"). Separately, sodium dodecylbenzenesulfonate (concentration: 0.45 mass %, product of Aldrich) (0.45 g) was added to purified water (75 g), and then a water-soluble phenolic resin (BRL12OZ, product of Showa Highpolymer Co., Ltd.) (3.9 g) was dissolved in the resultant mixture. To the resultant solution was added vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (4.2 g). The resultant mixture was subjected to ultrasonic irradiation for 30 minutes, and then to stirring for one hour by use of a magnetic stirrer, to thereby prepare a dispersion (the dispersion will be called "liquid B").

After being cooled to 60° C., the liquid A was mixed with the liquid B. Subsequently, the resultant mixture was frozen in a freezer, and then subjected to freeze-drying in a manner similar to that of Example 1 for removal of water.

Thereafter, the resultant product was thermally treated in a tubular heating furnace under a stream of argon gas (10 L/min) at 800° C. for one hour, to thereby produce a porous material. The thus-produced porous material was found to have a porosity of 0.98, a vapor grown carbon fiber content of 93 mass %, a specific surface area of 72 m²/g, and a volume resistivity of 40 Ω·cm. The percent volumetric shrinkage of the porous material during thermal treatment was found to be 15 vol. %.

EXAMPLE 5

Agar (1.5 g) was dissolved in purified water (50 g) under heating at 95° C., to thereby prepare a solution (the solution will be called "liquid A"). Separately, sodium dodecylbenzenesulfonate (concentration: 40 mass %, product of Aldrich) (0.45 g) was added to purified water (75 g), and then an aqueous solution (6.5 g) containing 40 mass % sodium silicate (product of Junsei Chemical Co., Ltd.) was added to the resultant mixture. To the resultant solution was added vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (4.2 g). The resultant mixture was subjected to ultrasonic irradiation for 30 minutes, and then to stirring for one hour by use of a magnetic stirrer, to thereby prepare a dispersion (the dispersion will be called "liquid B").

After being cooled to 60° C., the liquid A was mixed with the liquid B. Subsequently, the resultant mixture was frozen in a freezer, and then subjected to freeze-drying in a manner similar to that of Example 1 for removal of water.

Figure 2:
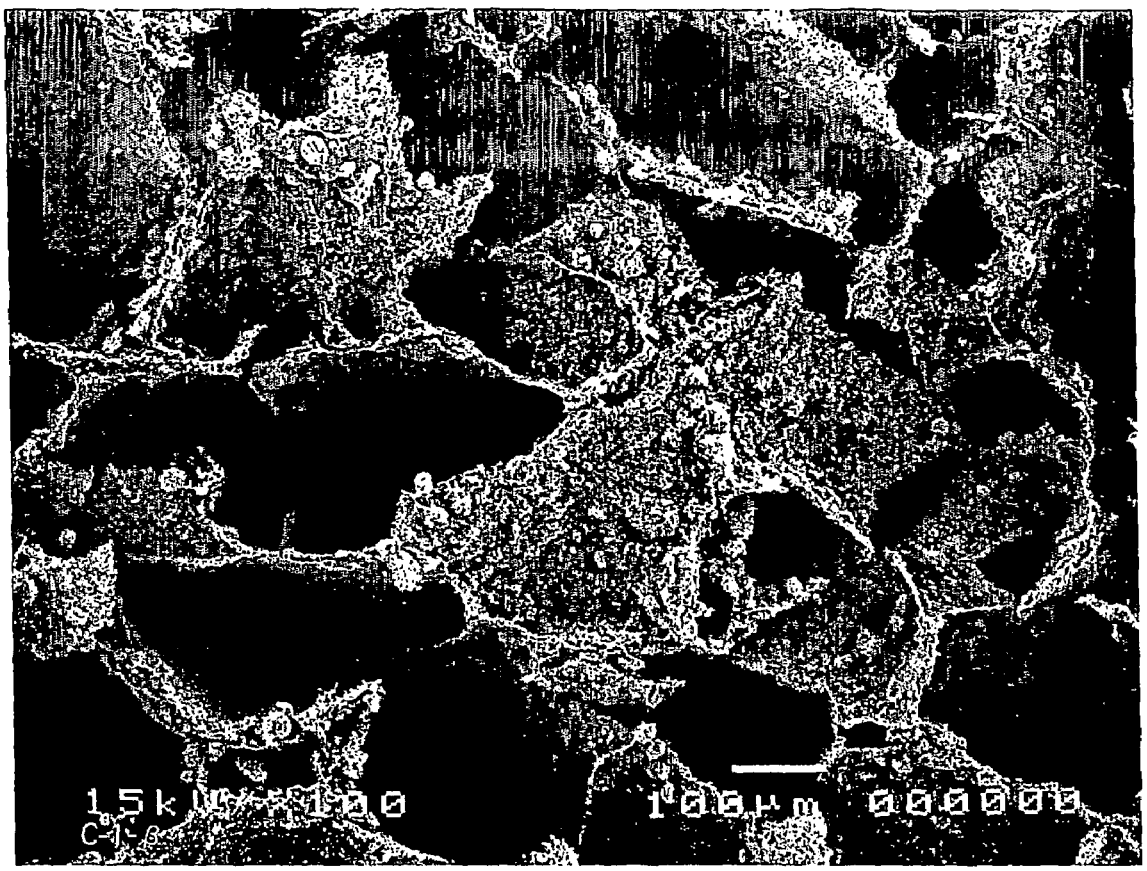
FIG. 2 shows a scanning electron micrograph of the porous material produced in Example 5.
Figure 3:
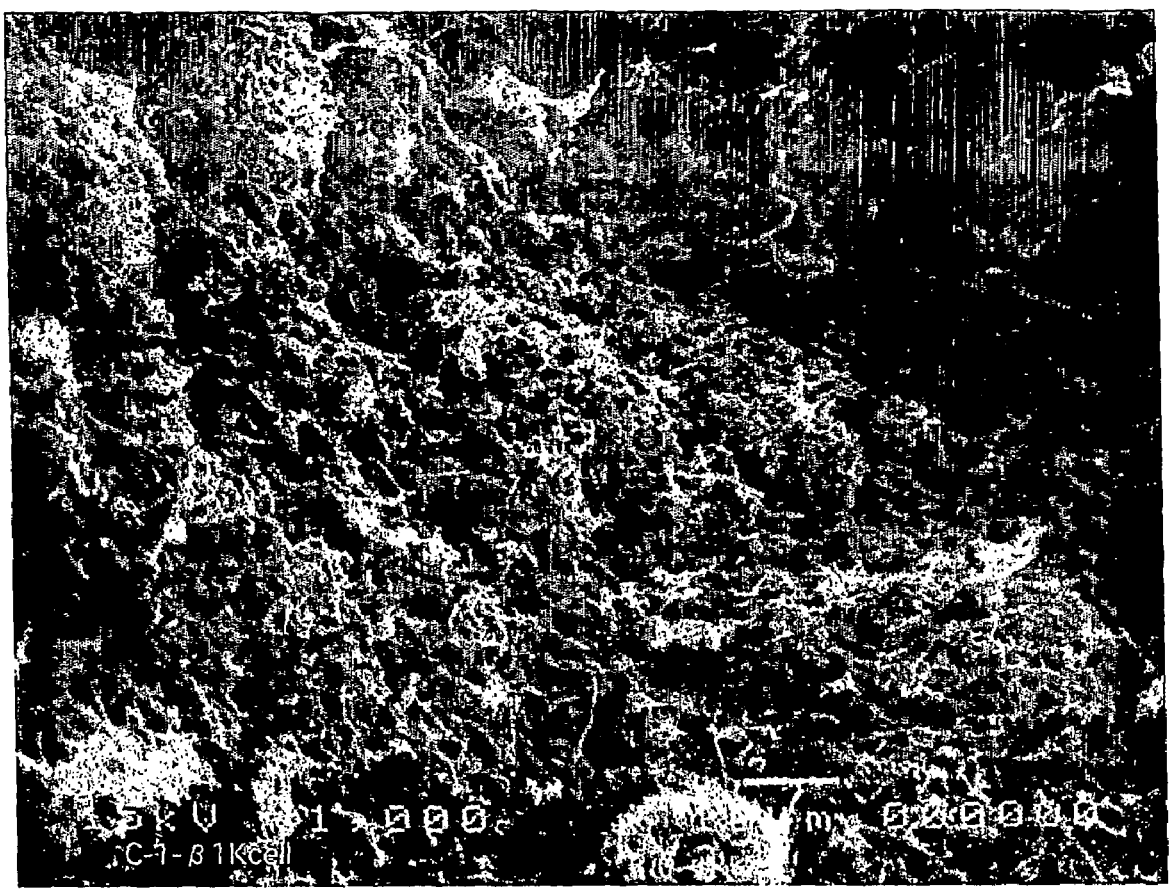
FIG. 3 shows an enlarged scanning electron micrograph of cell walls of the porous material of FIG. 2.

Thereafter, the resultant product was thermally treated in a tubular heating furnace under a stream of argon gas (10 L/min) at 800° C. for one hour, to thereby produce a porous material. The thus-produced porous material was found to have a porosity of 0.98, a vapor grown carbon fiber content of 38 mass %, a specific surface area of 5 m²/g, and a volume resistivity of 125 Ω·cm. The percent volumetric shrinkage of the porous material during thermal treatment was found to be 5 vol. %. Observation of the porous material under a scanning electron microscope revealed that the material contains numerous pores (FIG. 2), and the surface of cell walls of the porous material has a porous structure (FIG. 3).

EXAMPLE 6

Agar (1.5 g) was dissolved in purified water (50 g) under heating at 95° C., to thereby prepare a solution (the solution will be called "liquid A"). Separately, vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (3 g) was added to purified water (45 g), and the resultant mixture was subjected to ultrasonic irradiation for 30 minutes. A dispersion of fluorine-containing resin particles (MDF PTFE30-J (dispersoid content: 60 mass %); product of Du Pont-Mitsui Fluorochemicals Co., Ltd.) (5 g) was added to the resultant solution, to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Thereafter, the resultant product was thermally treated in a tubular heating furnace under a stream of argon gas (10 L/min) at 400° C. for one hour, to thereby produce a porous material. The thus-produced porous material was found to have a porosity of 0.96, a vapor grown carbon fiber content of 47 mass %, a specific surface area of 7 m²/g, and a volume resistivity of 50 Ω·cm. The percent volumetric shrinkage of the porous material was found to be 2 vol. %.

EXAMPLE 7

Agar (1.5 g) was dissolved in purified water (50 g) under heating at 95° C., to thereby prepare a solution (the solution will be called "liquid A"). Separately, vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (3 g) was added to purified water (45 g), and the resultant mixture was subjected to ultrasonic irradiation for 30 minutes. A dispersion of fluorine-containing resin particles (MDF PTFE30-J (dispersoid content: 60 mass %); product of Du Pont-Mitsui Fluorochemicals Co., Ltd.) (10 g) was added to the resultant solution, to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Thereafter, the resultant product was thermally treated in a tubular heating furnace under a stream of argon gas (10 L/min) at 400° C. for one hour, to thereby produce a porous material. The thus-produced porous material was found to have a porosity of 0.95, a vapor grown carbon fiber content of 32 mass %, a specific surface area of 4 m$^2$/g, and a volume resistivity of 65 Ω·cm. The percent volumetric shrinkage of the porous material was found to be 19 vol. %.

EXAMPLE 8

Agar (1.5 g) was dissolved in purified water (50 g) under heating at 95° C., to thereby prepare a solution (the solution will be called "liquid A"). Separately, vapor grown carbon fiber (VGCF (registered trademark), product of Showa Denko K. K.; fiber diameter: 150 nm, aspect ratio: 60, specific surface area: 13 m$^2$/g, Raman spectrum intensity ratio: 0.15) (3 g) was added to purified water (45 g), and the resultant mixture was subjected to ultrasonic irradiation for 30 minutes. A dispersion of fluorine-containing resin particles (MDF PTFE30-J (dispersoid content: 60 mass %); product of Du Pont-Mitsui Fluorochemicals Co., Ltd.) (30 g) was added to the resultant solution, to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Thereafter, the resultant product was thermally treated in a tubular heating furnace under a stream of argon gas (10 L/min) at 400° C. for one hour, to thereby produce a porous material. The thus-produced porous material was found to have a porosity of 0.91, a vapor grown carbon fiber content of 14 mass %, a specific surface area of 3 m$^2$/g, and a volume resistivity of 110 Ω·cm. The percent volumetric shrinkage of the porous material was found to be 19 vol. %.

EXAMPLE 9

Agar (1.5 g) was dissolved in purified water (50 g) under heating at 95° C., to thereby prepare a solution (the solution will be called "liquid A"). Separately, vapor grown carbon fiber (VGCF (registered trademark), product of Showa Denko K. K.; fiber diameter: 150 nm, aspect ratio: 60, specific surface area: 13 m$^2$/g, Raman spectrum intensity ratio: 0.15) (3 g) was added to purified water (45 g), and the resultant mixture was subjected to ultrasonic irradiation for 30 minutes. A dispersion of fluorine-containing resin particles (MDF PTFE30-J (dispersoid content: 60 mass %); product of Du Pont-Mitsui Fluorochemicals Co., Ltd.) (50 g) was added to the resultant solution, to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Thereafter, the resultant product was thermally treated in a tubular heating furnace under a stream of argon gas (10 L/min) at 400° C. for one hour, to thereby produce a porous material. The thus-produced porous material was found to have a porosity of 0.70, a vapor grown carbon fiber content of 10 mass %, a specific surface area of 2 m$^2$/g, and a volume resistivity of 400 Ω·cm. The percent volumetric shrinkage of the porous material was found to be 8 vol. %.

COMPARATIVE EXAMPLE 1

The following procedure was performed by means of the method described in Japanese Kohyo Patent Publication No. 9-505266.

Agar (1.5 g) was dissolved in purified water (50 g) under heating at 95° C., to thereby prepare a solution (the solution will be called "liquid A"). Separately, a dispersion of fluorine-containing resin particles (MDF PTFE30-J (dispersoid content: 60 mass %); product of Du Pont-Mitsui Fluorochemicals Co., Ltd.) (5 g) was added to purified water (45 g), to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Figure 4:
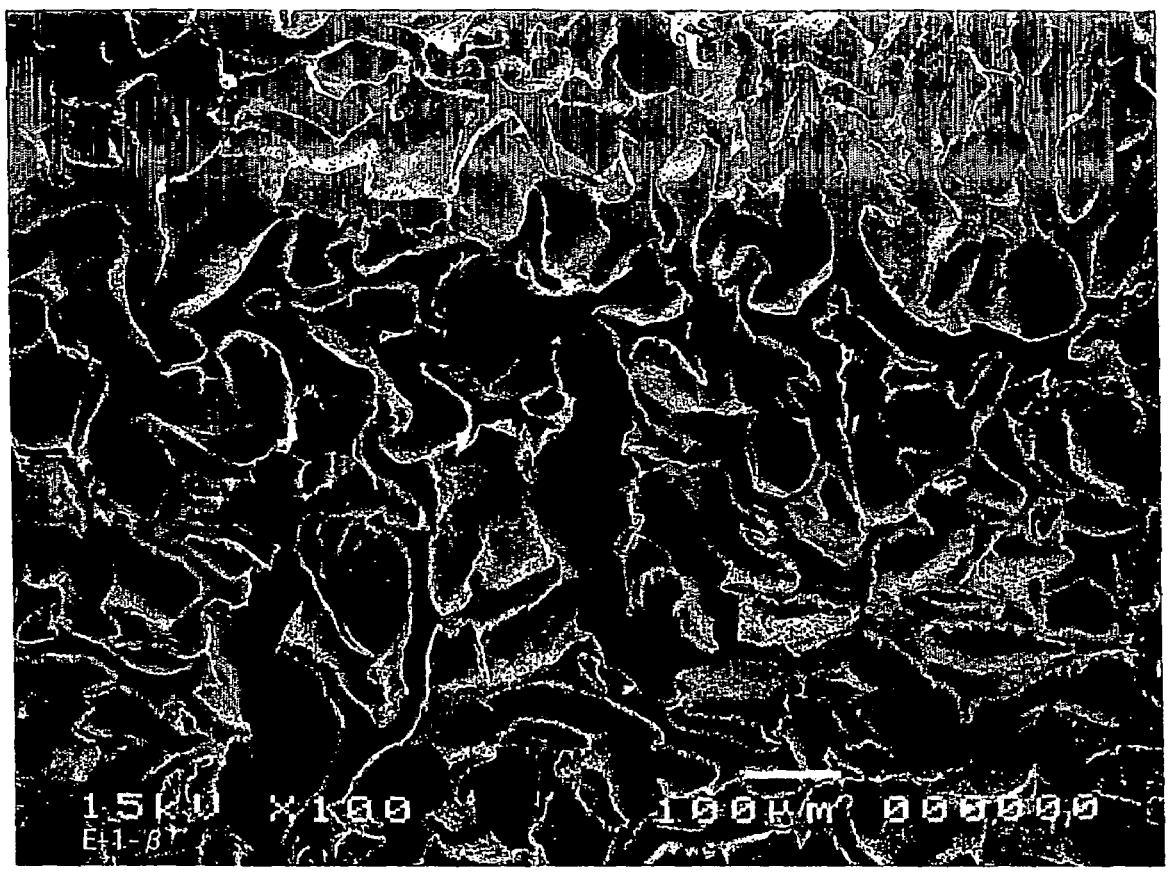
FIG. 4 shows a scanning electron micrograph of the porous material produced in Comparative Example 1.

Thereafter, the resultant product was thermally treated in a tubular heating furnace under a stream of argon gas (10 L/min) at 400° C. for one hour, to thereby produce a porous material. The thus-produced porous material was found to have a porosity of 0.73, a specific surface area of 1 m$^2$/g, and a volume resistivity of 10$^{10}$ Ω·cm or more. The percent volumetric shrinkage of the porous material was found to be 90 vol. %. Observation of the porous material under a scanning electron microscope revealed that the porous material has cell walls obviously thicker than those of each of the porous materials of Examples 1 through 9 (FIG. 4).

COMPARATIVE EXAMPLE 2

The following procedure was performed by means of the method described in Japanese Kohyo Patent Publication No. 9-505266.

Agar (1.5 g) was dissolved in purified water (50 g) under heating at 95° C., to thereby prepare a solution (the solution will be called "liquid A"). Separately, a dispersion of fluorine-containing resin particles (MDF PTFE30-J (dispersoid content: 60 mass %); product of Du Pont-Mitsui Fluorochemicals Co., Ltd.) (10 g) was added to purified water (40 g), to thereby prepare a dispersion (the dispersion will be called "liquid B").

After being cooled to 60° C., the liquid A was mixed with the liquid B under stirring. Thereafter, the resultant mixture was frozen in a freezer at −15° C. to −20° C., and then subjected to freeze-drying in a manner similar to that of Example 1 for removal of water.

Thereafter, the resultant product was thermally treated in a tubular heating furnace under a stream of argon gas (10 L/min) at 400° C. for one hour, to thereby produce a porous material. The thus-produced porous material was found to have a porosity of 0.75, a specific surface area of 1 m$^2$/g, and a volume resistivity of 10$^{10}$ Ω·cm or more. The percent volumetric shrinkage of the porous material was found to be 85 vol. %.

COMPARATIVE EXAMPLE 3

Agar (1.5 g) was dissolved in purified water (50 g) under heating at 95° C., to thereby prepare a solution (the solution will be called "liquid A"). Separately, sodium dodecylbenzenesulfonate (concentration: 40 mass %, product of Aldrich) (0.45 g) was dissolved in purified water (75 g), to thereby prepare an aqueous solution (the solution will be called "liquid B").

After being cooled to 60° C., the liquid A was mixed with the liquid B. Thereafter, the resultant mixture was frozen in a freezer at −15° C. to −20° C., and then subjected to freeze-drying in a manner similar to that of Example 1 for removal of water, to thereby produce a porous material. The thus-produced porous material was found to have a porosity of 0.98 and a volume resistivity of $10^{10}$ Ω·cm or more.

Table 1 shows the results of Examples 1 through 9 and Comparative Examples 1 through 3.

volume resistivity of the thus-produced resin composite material was measured in a manner similar to that of Example 10, and the volume resistivity was found to be 500 Ω·cm.

COMPARATIVE EXAMPLE 4

Polycarbonate (Panlite, product of Teijin Chemicals Ltd.) (960 g) and vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (40 g) were kneaded and extruded in a kneading-extrusion apparatus (Labo Plastomill, product of Toyo Seiki Seisaku-sho, Ltd.) while the apparatus was heated to 280° C., to thereby produce a resin

TABLE 1

Raw material and porosity of porous material

| | | Components (solid content) | | | | | | Percent volume shrinkage after | |
|---|---|---|---|---|---|---|---|---|---|
| | | Agar (g) | Vapor grown carbon fiber (g) | Water-soluble phenolic resin (g) | Sodium silicate (g) | PTFE dispersion (g) | Porosity | Specific surface area (m²/g) | thermal treatment (%) | Volume resistivity (Ω · cm) |
| Example | 1 | 1.5 | 4.2 | — | — | — | 0.95 | 12 | — | 130 |
| | 2 | 1.5 | 4.2 | — | — | — | 0.98 | 520 | 13 | 40 |
| | 3 | 1.5 | 8.5 | — | — | — | 0.98 | 13 | — | 10 |
| | 4 | 1.5 | 4.2 | 6.5 | — | — | 0.98 | 72 | 15 | 40 |
| | 5 | 1.5 | 4.2 | — | 6.5 | — | 0.98 | 5 | 5 | 125 |
| | 6 | 1.5 | 3 | — | — | 5 | 0.96 | 7 | 2 | 50 |
| | 7 | 1.5 | 3 | — | — | 10 | 0.95 | 4 | 19 | 65 |
| | 8 | 1.5 | 3 | — | — | 30 | 0.91 | 3 | 19 | 110 |
| | 9 | 1.5 | 3 | — | — | 50 | 0.70 | 2 | 8 | 400 |
| Comparative Example | 1 | 1.5 | — | — | — | 5 | 0.73 | 1 | 90 | >$10^{10}$ |
| | 2 | 1.5 | — | — | — | 10 | 0.75 | 1 | 85 | >$10^{10}$ |
| | 3 | 1.5 | — | — | — | — | 0.98 | — | — | >$10^{10}$ |

EXAMPLE 10

The porous material described in Example 1 (100 g) was placed in a metallic container, and polycarbonate (Panlite, product of Teijin Chemicals Ltd.) (96 g) which had been melted at 280° C. was poured into the container. The container was heated in a vacuum gas replacement furnace (KDF-V50R, product of Denken Co., Ltd.) for three hours under vacuum ($10^{-1}$ Pa), to thereby produce a resin composite material containing the porous material impregnated with the polycarbonate. The volume resistivity of the thus-produced resin composite material was measured by use of a resistivity meter (Loresta HP, model: MCP-T410, product of Dia Instruments Co., Ltd.) by means of the four-probe method, and the volume resistivity was found to be 560 Ω·cm.

EXAMPLE 11

The procedure of Example 10 was repeated, except that the porous material described in Example 2 (100 g) was employed, to thereby produce a resin composite material. The volume resistivity of the thus-produced resin composite material was measured in a manner similar to that of Example 10, and the volume resistivity was found to be 620 Ω·cm.

EXAMPLE 12

The procedure of Example 10 was repeated, except that the porous material described in Example 4 (100 g) was employed, to thereby produce a resin composite material. The composite material. The volume resistivity of the thus-produced resin composite material was measured in a manner similar to that of Example 10, and the volume resistivity was found to be $2.3 \times 10^{14}$ Ω·cm.

COMPARATIVE EXAMPLE 5

Polycarbonate (Panlite, product of Teijin Chemicals Ltd.) (900 g) and vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (100 g) were kneaded and extruded in a kneading-extrusion apparatus (Labo Plastomill, product of Toyo Seiki Seisaku-sho, Ltd.) while the apparatus was heated to 280° C., to thereby produce a resin composite material. The volume resistivity of the thus-produced resin composite material was measured in a manner similar to that of Example 10, and the volume resistivity was found to be $1.6 \times 10^8$ Ω·cm.

COMPARATIVE EXAMPLE 6

Polycarbonate (Panlite, product of Teijin Chemicals Ltd.) (700 g) and vapor grown carbon fiber (VGCF (registered trademark), product of Showa Denko K. K.; fiber diameter: 150 nm, aspect ratio: 60, specific surface area: 13 m²/g, Raman spectrum intensity ratio: 0.15) (300 g) were kneaded and extruded in a kneading-extrusion apparatus (Labo Plastomill, product of Toyo Seiki Seisaku-sho, Ltd.) while the apparatus was heated to 280° C., to thereby produce a resin composite material. The volume resistivity of the thus-produced resin composite material was measured in a manner similar to that of Example 10, and the volume resistivity was found to be 7.3×10$^4$ Ω·cm.

Table 2 shows the results of Examples 10 through 12 and Comparative Examples 4 through 6.

TABLE 2

Volume resistivity of resin composite material

| | Matrix material Polycarbonate (mass %) | Resin composite material Volume resistivity (Ω · cm) |
|---|---|---|
| Example 10 | 96 | 560 |
| Example 11 | 96 | 620 |
| Example 12 | 96 | 500 |
| Comparative Example 4 | 96 | 2.3 × 10$^{14}$ |
| Comparative Example 5 | 90 | 1.6 × 10$^8$ |
| Comparative Example 6 | 70 | 7.3 × 10$^4$ |

INDUSTRIAL APPLICABILITY

According to the porous material and the production method of the same of the present invention, the length of fiber filaments of vapor grown carbon fiber contained in the porous material is maintained, and a three-dimensional network is formed between the fiber filaments. Therefore, in a composite material formed from the porous material, even if the amount of vapor grown carbon fiber to be added is smaller, the carbon fiber exhibits the effect of imparting, for example, electrical conductivity to the composite material, as compared in a composite material produced through a conventional production method. Since the porous material contains vapor grown carbon fiber, the volumetric shrinkage of the porous material during thermal treatment can be suppressed.

The invention claimed is:

1. A porous material comprising 10 to 95 mass % of vapor grown carbon fiber and 90 to 5 mass % of a gelable substance, wherein each fiber filament of the vapor grown carbon fiber has a diameter of 1 to 1,000 nm, an aspect ratio of 5 to 15,000, and a specific surface area of 2 to 2,000 m$^2$/g, and the ratio of the intensity of the peak at 1,360 cm$^{-1}$ in a Raman scattering spectrum to that of the peak at 1,580 cm$^{-1}$ in the spectrum; i.e., $I_{1360}/I_{1580}$, is 0.1 to 2.0.

2. The porous material according to claim 1, wherein boron is contained, in an amount of 0.001 to 5 mass %, in the interior of or on the surface of crystals constituting the vapor grown carbon fiber.

3. The porous material according to claim 1, wherein the porosity of the porous material, which is represented by the ratio of the total volume of pores (V) to the entire volume ($V_0$) of the porous material; i.e., $V/V_0$, is 0.50 to 0.99.

4. The porous material according to claim 1, which has a specific surface area of 5 to 1,000 m$^2$/g.

5. The porous material according to claim 1, which has an electrical resistivity of less than 10$^3$ Ω·cm.

6. A method for producing the porous material comprising vapor grown carbon fiber as recited in claim 1, which is characterized by comprising dispersing vapor grown carbon fiber in a solution of a gelable substance, and subsequently gelling the gelable substance, followed by removal of solvent.

7. The method for producing a porous material according to claim 6, wherein the solution of a gelable substance is a solution containing a water-soluble polymer and/or an alkali silicate dissolved therein, and/or solid fine particles dispersed therein.

8. The method for producing a porous material according to claim 6, wherein, after the solvent is removed, thermal treatment is carried out in an inert atmosphere at a temperature of 100 to 1,000° C.

9. The method for producing a porous material according to claim 6, wherein removal of the solvent is carried out by means of vacuum-drying or freeze-drying.

10. The method for producing a porous material according to claim 6, wherein removal of the solvent is carried out by increasing temperature and pressure above the critical temperature and critical pressure of the solvent, respectively, and by subsequently reducing pressure to the critical pressure of the solvent or lower.

11. The method for producing a porous material according to claim 6, wherein the gelable substance is an organic compound.

12. The method for producing a porous material according to claim 11, wherein the organic compound is at least one species selected from agar, agarose, gelatin and an alginic acid salt, and the solvent is water.

13. The method for producing a porous material according to claim 12, wherein the solvent is an aqueous solution containing a surfactant.

14. The method for producing a porous material according to claim 7, wherein the water-soluble polymer is at least one species selected from phenolic resin, polyvinyl alcohol, polyethylene oxide, polyacrylic acid and a polyacrylic acid salt.

15. The method for producing a porous material according to claim 6, wherein the gelable substance is a sol produced through hydrolysis, condensation, or polymerization of a metallic compound dissolved in a polar solvent by use of an acid or an alkali.

16. The method for producing a porous material according to claim 15, wherein the metallic compound is at least one species selected from metal alkoxide, metal acetylacetonate, acetic acid metallic salt, carboxylic acid metallic salt, nitric acid metallic salt, metallic chloride and metallic oxy compound, and the solvent is water or a mixture of water and a polar organic solvent.

17. A method for producing the porous material as recited in claim 1, characterized by comprising dispersing vapor grown carbon fiber in a liquid polymer, and subsequently foaming the liquid polymer.

18. The method for producing a porous material according to claim 17, the liquid polymer contains a polyisocyanate and a polyol.

19. A porous material produced through the production method as recited in claim 6.

20. A resin composite material characterized by being formed by impregnating with a polymer the porous material as recited in claim 1.

21. The resin composite material according to claim 20, wherein the polymer is at least one polymer selected from phenolic resin, epoxy resin, polyimide and polycarbonate.

22. A method for producing a resin composite material, characterized by comprising impregnating with a polymer the porous material as recited in claim 1.

23. A metal composite material characterized by being formed by incorporating a metal into the porous material as recited in claim 1.

24. The metal composite material according to claim 23, wherein the metal is at least one metal selected from aluminum, magnesium, copper and silver or a molten alloy thereof.

25. A method for producing a metal composite material, characterized by incorporating a metal into the porous material as recited in claim 1.

26. A filter for absorption of gas comprising the porous material as recited in claim 1.

27. A filter for filtration of water comprising the porous material as recited in claim 1.

28. A catalyst carrier comprising the porous material as recited in claim 1.

29. The porous material according to claim 1, wherein fiber filaments of the carbon fiber form a three-dimensional network.

* * * * *